(12) United States Patent
Dimmick

(10) Patent No.: US 11,928,678 B2
(45) Date of Patent: Mar. 12, 2024

(54) VARIABLE AUTHENTICATION PROCESS AND SYSTEM

(71) Applicant: Visa International Service Association, San Francisco, CA (US)

(72) Inventor: James Dene Dimmick, Belmont, CA (US)

(73) Assignee: Visa International Service Association, San Francisco, CA (US)

( * ) Notice: Subject to any disclaimer, the term of this patent is extended or adjusted under 35 U.S.C. 154(b) by 727 days.

(21) Appl. No.: 16/435,193

(22) Filed: Jun. 7, 2019

(65) Prior Publication Data

US 2019/0295076 A1    Sep. 26, 2019

Related U.S. Application Data

(63) Continuation of application No. 14/452,984, filed on Aug. 6, 2014, now Pat. No. 10,366,391.

(60) Provisional application No. 61/862,937, filed on Aug. 6, 2013.

(51) Int. Cl.
*G06Q 20/40* (2012.01)
*G06Q 20/32* (2012.01)
*H04L 9/40* (2022.01)

(52) U.S. Cl.
CPC .......... *G06Q 20/40* (2013.01); *G06Q 20/326* (2020.05); *G06Q 20/4012* (2013.01); *H04L 63/08* (2013.01); *H04L 63/083* (2013.01); *H04L 63/104* (2013.01)

(58) Field of Classification Search
CPC .... G06Q 20/40; G06Q 20/32; G06Q 20/4012; G06Q 20/3255; G06Q 20/384; H04L 63/083; H04L 63/104

USPC .......................................................... 705/72
See application file for complete search history.

(56) References Cited

U.S. PATENT DOCUMENTS

| | | | |
|---|---|---|---|
| 5,920,847 A * | 7/1999 | Kolling | G06Q 20/14 705/40 |
| 8,412,631 B2 | 4/2013 | Crofts | |
| 2001/0010095 A1 * | 7/2001 | Ellis | H04N 21/47 725/44 |
| 2003/0004876 A1 * | 1/2003 | Jacobson | G07F 7/0886 705/41 |
| 2008/0301056 A1 | 12/2008 | Weller et al. | |
| 2009/0037982 A1 | 2/2009 | Wentker | |

(Continued)

FOREIGN PATENT DOCUMENTS

| | | |
|---|---|---|
| JP | 2006-0190112 A | 7/2006 |
| WO | 2014/093390 A1 | 6/2014 |

OTHER PUBLICATIONS

Wikipedia , ISO8583, 2011 (Year: 2011).*
International Search Report and Written Opinion dated Mar. 27, 2014 in PCT/US2013/074200, 14 pages.

*Primary Examiner* — Courtney P Jones
(74) *Attorney, Agent, or Firm* — Kilpatrick Townsend & Stockton LLP

(57) ABSTRACT

Efficient methods and systems for verifying personal identifiers in transactions such as financial transactions are disclosed. In an exemplary method, an authentication server computer may provide an account number and a personal identifier such as a PIN to a payment processing network server computer. The payment processing network server computer may then determine which of a plurality of authentication processes to initiate.

21 Claims, 10 Drawing Sheets

(56) References Cited

U.S. PATENT DOCUMENTS

| | | | |
|---|---|---|---|
| 2009/0198617 A1* | 8/2009 | Soghoian | G06Q 20/04 |
| | | | 705/65 |
| 2011/0016051 A1* | 1/2011 | Trifiletti | G06Q 20/401 |
| | | | 707/769 |
| 2011/0082767 A1 | 4/2011 | Ryu et al. | |
| 2011/0178926 A1 | 7/2011 | Lindelsee | |
| 2011/0302083 A1* | 12/2011 | Bhinder | G06Q 20/3223 |
| | | | 705/44 |
| 2012/0023558 A1 | 1/2012 | Rafiq | |
| 2012/0036075 A1* | 2/2012 | Klein | G06Q 20/382 |
| | | | 705/64 |
| 2012/0095852 A1 | 4/2012 | Bauer et al. | |
| 2012/0136796 A1 | 5/2012 | Hammad et al. | |
| 2012/0252405 A1 | 10/2012 | Lortz | |
| 2013/0159195 A1 | 6/2013 | Kirillin | |
| 2013/0174241 A1 | 7/2013 | Cha | |
| 2013/0198081 A1* | 8/2013 | Royyuru | G06Q 20/425 |
| | | | 705/44 |
| 2013/0226792 A1* | 8/2013 | Kushevsky | G06Q 20/3674 |
| | | | 705/41 |
| 2013/0226812 A1 | 8/2013 | Landrok | |
| 2013/0263211 A1 | 10/2013 | Neuman | |
| 2013/0275307 A1 | 10/2013 | Khan | |
| 2014/0025580 A1* | 1/2014 | Bacastow | G06Q 20/327 |
| | | | 705/44 |
| 2014/0149293 A1* | 5/2014 | Laracey | G06Q 20/3821 |
| | | | 705/44 |
| 2014/0164254 A1 | 6/2014 | Dimmick | |
| 2014/0250018 A1* | 9/2014 | Phillips | G06Q 20/405 |
| | | | 705/72 |
| 2014/0372308 A1* | 12/2014 | Sheets | G06Q 20/20 |
| | | | 705/44 |
| 2015/0039506 A1* | 2/2015 | Groarke | G06Q 20/02 |
| | | | 705/44 |
| 2016/0019547 A1* | 1/2016 | Gurnani | G06Q 20/3223 |
| | | | 705/44 |
| 2018/0211249 A1* | 7/2018 | Sims | G06Q 20/352 |

\* cited by examiner

VARIABLE AUTHENTICATION PROCESS AND SYSTEM

CROSS-REFERENCES TO RELATED APPLICATIONS

This application is continuation of U.S. patent application Ser. No. 14/452,984, filed on Aug. 6, 2014, which is a non-provisional of and claims priority to U.S. Provisional Patent Application No. 61/862,937, filed on Aug. 6, 2013, which are herein incorporated by reference in their entirety for all purposes.

BACKGROUND

A unique authentication process utilizing an authentication computer is described in U.S. patent application Ser. No. 14/102,332, entitled "Authenticating Remote Transactions Using a Mobile Device," which is by the same inventor as the present application and is assigned to the same assignee as the present application. In U.S. patent application Ser. No. 14/102,332, the authentication computer can receive a personal identifier authentication request from a service provider computer such as a wallet server computer or a merchant server computer. The authentication computer can then request a PIN from the consumer and the authentication computer can verify that the PIN is correct. If it is, then data relating to the authentication of the PIN is forwarded to a payment processing network, which may in turn process a payment transaction using the authentication data.

While the methods and systems described in U.S. patent application Ser. No. 14/102,332 are effective, a number of improvements can be made. For example, although authentication processing ensures that the transactions being conducted are authentic and are not conducted by unauthorized persons, they can delay the completion of the transactions. While it is possible to design a system with only one authentication process, different types of transactions are conducted under different circumstances. A single authentication process may not be the most efficient way to authenticate the consumer for all transactions. It is thus desirable to provide for systems and methods that can reduce the time needed to perform the authentication processing for a variety of different transaction types.

Embodiments of the invention address these and other problems, collectively and individually.

BRIEF SUMMARY

Embodiments of the present invention relate to methods and systems for authenticating a user, especially during a payment transaction.

One embodiment of the invention is directed to a method. The method comprises receiving, at a server computer and during a transaction that uses an account of a user, a personal identifier authentication request message from an authentication computer, where the personal identifier authentication request message comprises a personal identifier of the user. The personal identifier may be in encrypted or unencrypted form. In response to receiving the personal identifier authentication request message, the server computer determines a personal identification authentication process to perform. The personal identification authentication process is one of a plurality of personal identification authentication processes. The method further includes performing, by the server computer, the determined personal identification authentication process.

Other embodiments of the invention are directed towards server computers and systems configured to perform the above-described method and other methods.

These and other embodiments of the invention are described in further detail below.

DETAILED DESCRIPTION

Figure 1:
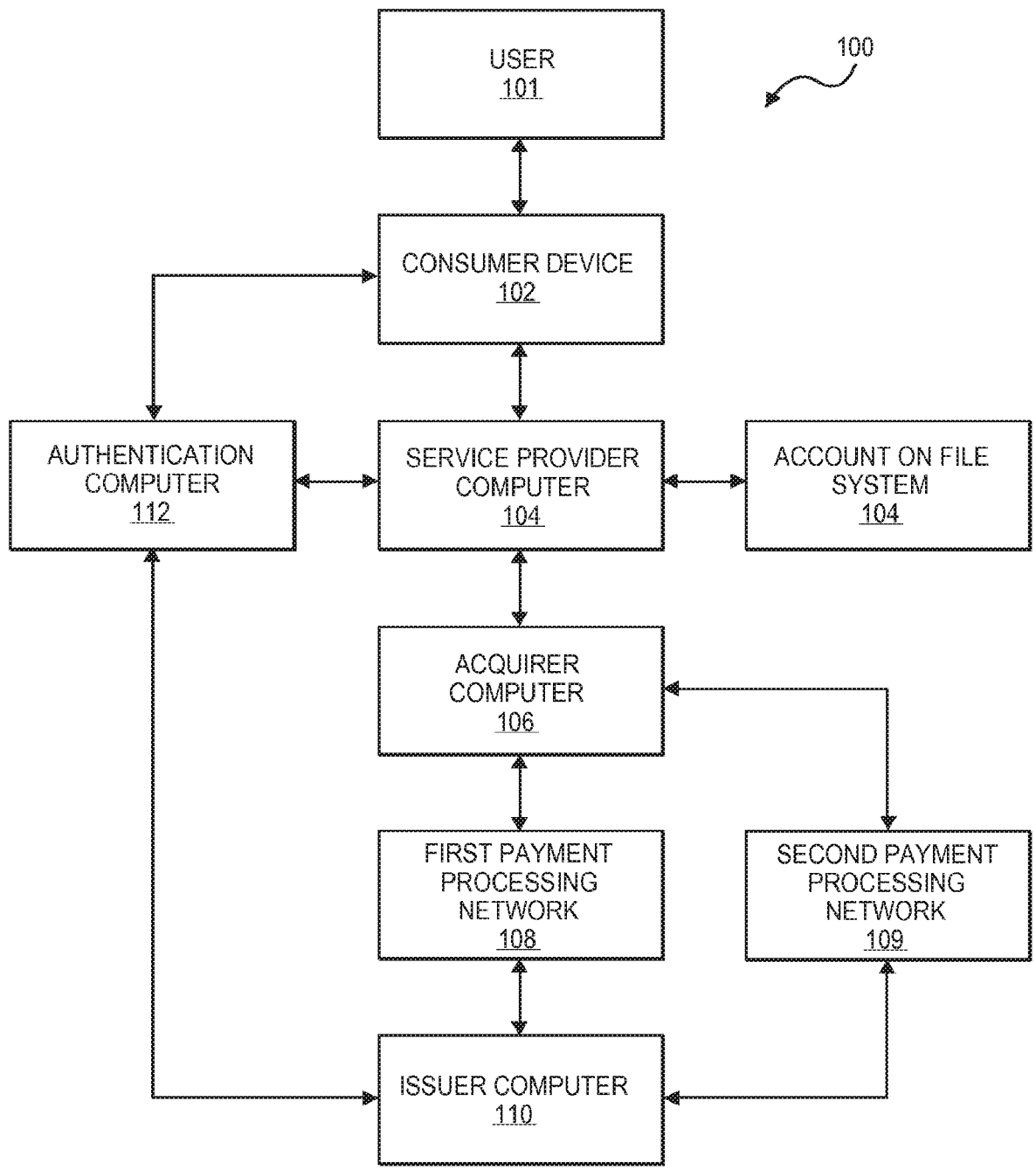
FIG. 1 shows a block diagram of a system according to an embodiment of the invention.

Embodiments of the invention provide for methods and systems for authenticating personal identifier information. In embodiments of the invention, an authentication application on a mobile device can allow a user to securely enter a PIN into the mobile device. The PIN can be transmitted to an authentication computer, which can transmit the PIN to a server computer in a payment processing network. The server computer may then select a personal identifier verification process to perform and initiate that personal identifier verification process. The personal identification authentication process may be one of many available personal identifier verification processes. The determination as to which personal identification authentication process to perform may depend on the circumstances or characteristics of the particular transaction. A hierarchy may be employed whereby a first personal identification authentication process is performed if a first condition is met, a second personal identification authentication process is performed if a second condition is met, a third personal identification authentication process is performed if a third condition is met, etc. The choice of which personal identifier verification process to perform can depend upon which process will be the fastest to authenticate the consumer, given the specific circumstances of the current transactions. Further, the authentication processes can be performed independently of the service provider.

Prior to discussing embodiments of the invention, description of some terms may be helpful in understanding embodiments of the invention.

"Authentication" may refer to validating an entity such as a consumer or a consumer device to determine if the entity is who it claims to be. Authentication may include validating one or more identifiers associated with the entity. For example, authenticating a consumer may include validating if a personal identifier such as a PIN or biometric that is provided by the consumer matches with the personal identifier stored in a database record associated with the consumer's account. In some embodiments, a consumer may be authorized to conduct a financial transaction only if the consumer has been authenticated.

An "authentication request message" may include a message used for requesting authentication of a consumer. For example, an authentication request message may be sent to a consumer's mobile device requesting that the consumer provide a personal identifier such as a PIN or a biometric identifier for authentication before a transaction can be authorized. Authentication request messages may take any form. For example, they may in the form of e-mail messages, SMS messages, etc.

A "personal identifier" may refer to an identifier associated with a consumer that may be used to authenticate the consumer. Some non-limiting examples of personal identifiers may include Personal Identification Numbers (PINs), biometric identifiers or passwords. Passwords and PINs may comprise any suitable combination of alpha-numeric characters. A PIN can be associated with a payment card, and can be used at a POS terminal, ATM or any other acceptance point device. Biometric identifiers may include identifiers (or data) derived from biometrics such as fingerprints, facial expressions, voice samples, palm prints, body part geometries, iris scans, DNA samples, retina scans, and odors.

A "personal identifier verification request message" may include a message that requests that a personal identifier be verified. The personal identifier verification request message may be in any suitable form. For example, an exemplary personal identifier request message may in the form of an authorization request message that has an amount data field with no dollar amount or a zero dollar amount. In such instances, the authorization request message is not used to obtain authorization of a transaction, but is used to verify that a personal identifier is authentic.

An "authentication indicator" may refer to a result of an authentication process, or may simply indicate that an authentication process was attempted. In one embodiment, the authentication indicator may include a positive authentication result or a negative authentication result or that authentication has been attempted (but not yet confirmed). In one embodiment, the authentication indicator may be represented in binary form (e.g., a "1" for a positive authentication result and a "0" for a negative authentication result). However, other representations are possible. In some cases, an authentication indicator may comprise a verification value such as CAVV (card verification value) or AAV (account holder authentication value).

"Transaction details" may include information associated with a transaction. The transaction may be a purchase transaction, money transfer, ATM transaction, cash withdrawal, etc. In one embodiment, transaction details may include a consumer alias, a payment card type, a transaction amount, a merchant identifier, a phone number or any such relevant information associated with the transaction. In one embodiment, transaction details may include geo-location data associated with the consumer and/or the merchant. In one embodiment, transaction details may also include a number of items purchased, item quantities, item descriptions, coupons or discounts used, transaction types, transaction dates and times, etc.

An "authorization request message" may be an electronic message that is used to request authorization for a transaction. In some embodiments, an authorization request message may be sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example: a service code, a verification value (e.g., a CVV (card verification value), a dCVV (dynamic card verification value), etc.), a PIN, a CVV or AAV, an expiration date, etc. An authorization request message may also comprise transaction details associated with a current transaction as well as any other information that may be utilized in determining whether to identify and/or authorize a transaction.

A "zero dollar authorization request message" may be an electronic message that has a format that is the same as the above-described authorization request message, but has a zero in the amount data field instead of the amount of the transaction that is taking place. This can signal that the authorization request message is not being used to obtain authorization for a particular transaction, but is used to as a personal identifier verification request message that will verify that a personal identifier is authentic.

An "authorization response message" may be an electronic reply to an authorization request message. In some embodiment, an authorization response message may be generated by an issuing financial institution or a payment processing network to indicate whether a transaction is approved or denied. The authorization response message may include an authorization code, which may be a code that a credit card issuing bank returns in response to an authorization request message in an electronic message (either directly or through the payment processing network) to the merchant's access device (e.g. POS terminal) that indicates approval of the transaction. The code may serve as proof of authorization. As noted above, in some embodiments, a payment processing network may generate or forward the authorization response message to the merchant.

A "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of an SSL session. However, any method of creating a secure channel may be used. By establishing a secure channel, sensitive information related to a payment device (such as personal identifier, account numbers, CVV values, expiration dates, etc.) may be securely transmitted between the two entities to facilitate a transaction.

A "user" may be an entity, such as, an individual or a consumer that may be associated with one or more personal accounts and one or more consumer devices to conduct transactions.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication computer, an acquirer or an issuer.

I. Exemplary Systems

FIG. 1 illustrates a block diagram of a system 100, in one embodiment of the invention. FIG. 1 shows a consumer device 102 in communication with an authentication computer 112 and a service provider computer 104. A user 101 may use the consumer device 102. The service provider computer 104 may be in communication with account on file system 104 and the authentication computer 112. The various components shown in FIG. 1 may communicate through various data channels, some or all of which may include secure communications channels.

The service provider computer 104 may be in communication with a first payment processing network 108 and an issuer computer 110. An acquirer computer 106 may be in communication with the first payment processing network 108, the issuer computer 110, and the service provider computer 104. It may be located between (in an operational sense) the service provider computer 104 and the first payment processing network 108. A second payment processing network 109 is also illustrated. The second payment processing network 109, like the first payment processing network 108, may switch payment transaction authorization requests and responses, and clearing and settlement messages between issuers and acquirers.

The service provider computer 104 may be any suitable computer that is operated by a service provider. For example, the service provider computer 104 may be a merchant computer operated by a merchant or a wallet provider computer operated by a digital wallet provider. If the service provider computer 104 is a digital wallet computer, then an additional merchant computer (not shown) may be interposed between the acquirer computer 106 and the service provider computer 104. The merchant computer may operate a website or other host site to sell goods or services.

The account on file system 104 may be a system that comprises a database that stores and maps consumer device identifiers such as phone numbers to payment account numbers (e.g., credit card numbers). In some embodiments, the consumer device identifiers may be mapped to payment tokens (i.e., random or derived numbers that are substitutes for real payment account numbers). In such case, a payment token could serve as a consumer device identifier if it is tied to the consumer device, and that token could be mapped to a real account number in the account on file system 104.

The issuer computer 108 may be operated by an issuer that issued an account associated with a user of the consumer device 102. The account that is issued by the issuer may comprise a debit, credit, or prepaid account that can be associated with a debit, credit, or prepaid card. An issuer can be a bank, or some other entity such as a retailer.

The acquirer computer 106 is operated by an acquirer. An acquirer can be an entity that holds and/or manages an account of the service provider. The acquirer is typically a bank.

The first payment processing network 108 may include data processing subsystems, networks, and operations used to support and deliver authorization services, exception file services, and clearing and settlement services. For example, the payment processing network may comprise a server computer such as that shown in FIG. 2, which is described in further detail below. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 108 may use any suitable wired or wireless network, including the Internet.

The second payment processing network 109 may have characteristics that are similar to or different than the first payment processing network 109.

The consumer device 102 may be any suitable device that is capable of communication that is operated by the user. Examples of consumer devices include mobile phones, laptop computers, tablet computers, etc.

In some cases, the consumer device 102 may be a mobile phone and the user 101 may use a separate consumer device such as a laptop computer to communicate with the service provider computer 104.

Figure 2:
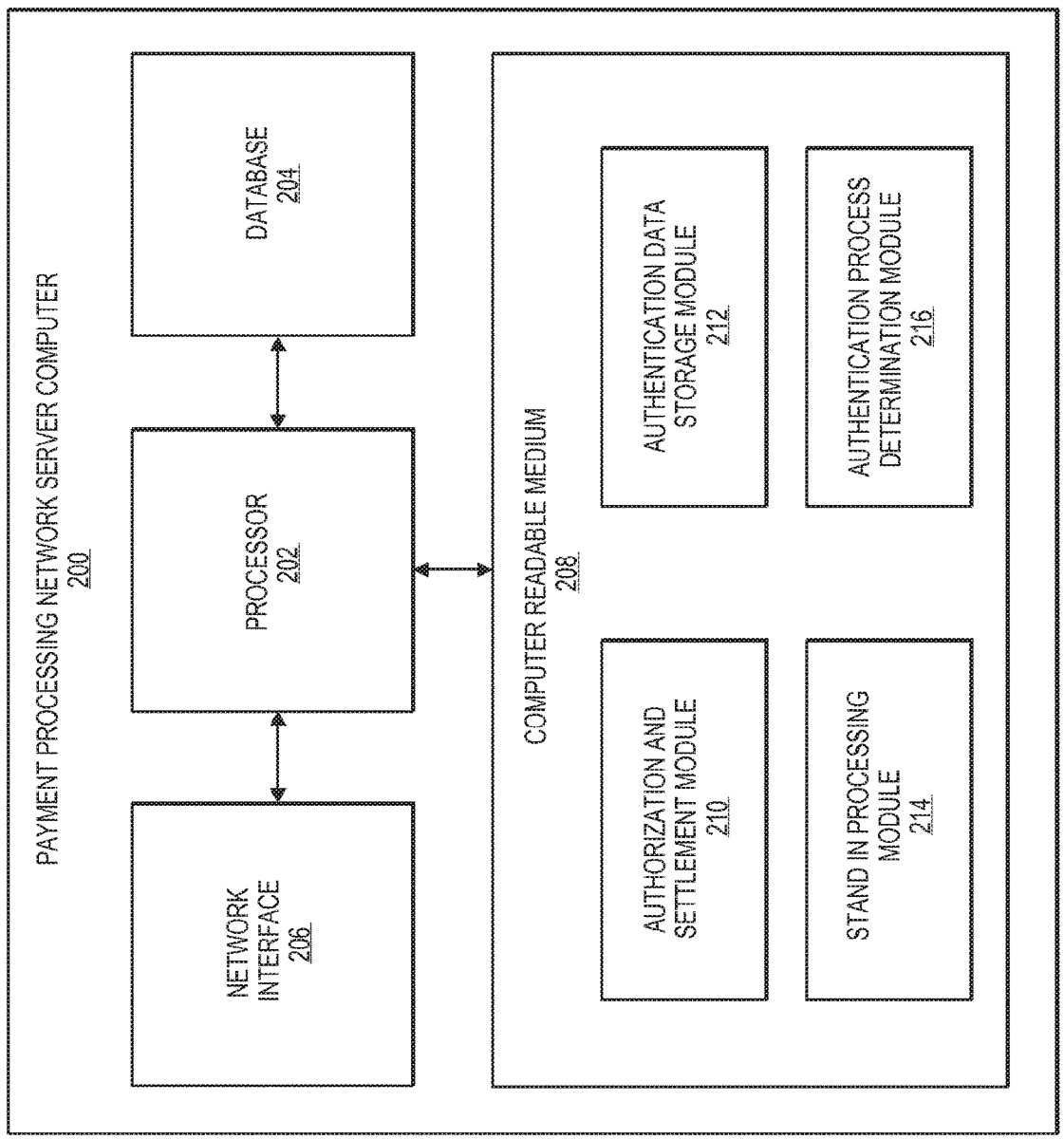
FIG. 2 shows a block diagram of a payment processing network computer according to an embodiment of the invention.

FIG. 2 shows a block diagram of a payment processing network server computer 200. The payment processing network server computer 200 may be present in the payment processing network 108 in FIG. 1 above. The functions described herein described by the payment processing network 108 may be performed by the payment processing network server computer 200.

The payment processing network server computer 200 comprises a processor 202. A network interface 206, a database 204, and a computer readable medium 208 are coupled to the processor.

The computer readable medium 208 may be formed from any suitable combination of hardware and/or software. It may store computer code to accomplish the functions of the payment processing network server computer 200. For example, it may comprise a number of software modules comprising an authorization and settlement module 210, a stand in authentication module 214, an authentication data storage module 212, and an authentication process determination module 216.

The authorization and settlement module 210 may comprise code for performing authorizing and settlement processing. Authorization processing may include the routing, generation or modification of authorization request messages. Settlement processing may include the generating, routing, or modification of clearing messages and the settlement of funds.

The authentication data storage module 212 may comprise code for storing and retrieving authentication data. Authentication data may include data that can be used to authenticate a user or any results associated with such authentication. For example, authentication data may include personal identifiers, which may include personal credentials such as personal identification numbers (PINs), home address information, mother's maiden name, etc.

The stand in processing module 214 may include code for performing authentication processing on behalf of an issuer or some other entity. For example, the stand in processing module 214 may comprise code for causing the processor to determine if a PIN or personal identifier matches a PIN or personal identifier that was previously provided by the user. The code may also cause the processor 202 to generate a score that relates to how authentic a received personal identifier could be.

The authentication process determination module 216 may comprise code for determining which authentication process to perform, based upon the particular circumstances of the transaction. It may include code for analyzing transaction data such as account identifiers such as primary account numbers (PANs) and payment network or payment processor preference data, and then code for selecting and initiating a specific authentication process in response to the analysis.

The network interface 206 may be configured to allow the payment processing network server computer 200 to communicate with other entities such as the authentication computer 112, the issuer computer 110, and the acquirer computer 106. Network interfaces may accept, communicate, and/or connect to a communications network. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The database 204 can store data. Such data may include data that relates to the authentication processes being performed. For example, encrypted or unencrypted personal identifiers received from the consumer devices may be stored in the database. The database may be a conventional, fault tolerant, relational, scalable, secure database such as Oracle or Sybase.

The processor 202 can comprise one or more processing units. An exemplary processing unit may be a CPU, which comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques.

Figure 3:
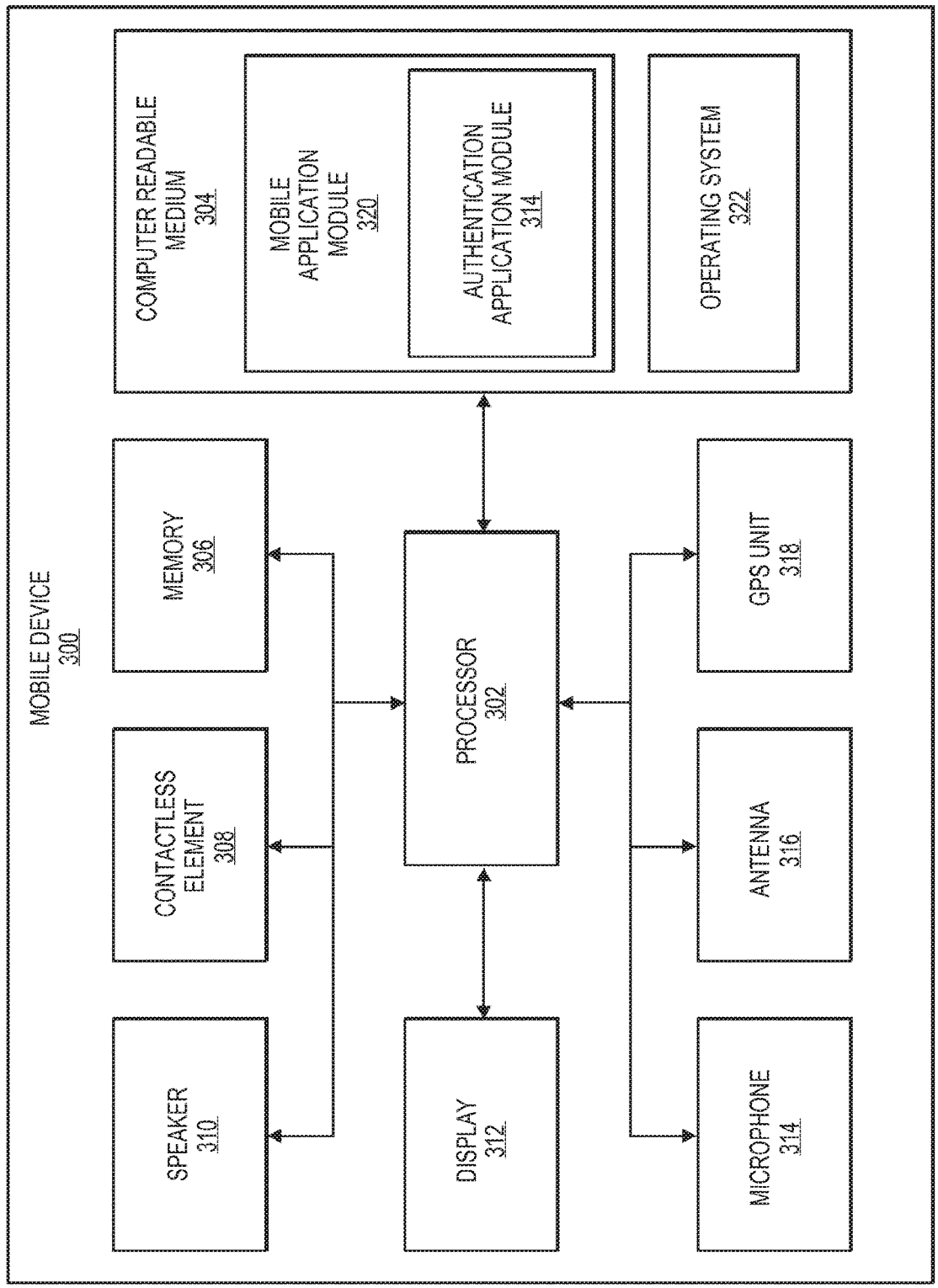
FIG. 3 shows a block diagram of a mobile device according to an embodiment of the invention.

FIG. 3 shows a block diagram of a mobile device 300. The mobile device 300 can be an example of the consumer device 102 in FIG. 1.

The mobile device 300 may include a computer readable medium 304, a memory 306, a contactless element 308, a speaker 310, a display 312, a microphone 314, an antenna 316, a GPS unit 318 and a camera unit 324. All of these components may be operatively coupled to a processor 302.

The mobile device 300 may be a mobile phone, a tablet, a PDA, a notebook, a laptop or any such electronic device capable of communicating and transferring data and/or control instructions via a wireless network (e.g., cellular network, internet, etc.) and short range communications. For example, the mobile device 300 may be a smart phone that can allow the consumer to enter a PIN without using any other device (e.g., via an application on mobile device 300). The mobile device 300 may also allow a consumer to download, install and execute applications on the mobile device 300. The mobile device 300 may also be configured as a payment device that may be used to conduct financial transactions such as purchases, money transfer, etc.

The computer readable medium 304 may comprise code executable by the processor 302 for implementing methods using embodiments of the invention. The computer readable medium 304 may be in the form of a memory that can store data and can be internal to the mobile device 300 or hosted remotely and accessed wirelessly by the mobile device 300. In some embodiments, the computer readable medium 304 may include non-volatile, non-writable storage area (e.g., Flash ROM) where the firmware/operating system may reside. The computer readable medium 304 may also include programmable storage area. The computer readable medium 304 may include an operating system 322 and a mobile application module 320 comprising an authentication application module 314. The mobile device 300 may be configured to enable a consumer to conduct transactions using the mobile application module 320.

The memory 306 may include RAM where volatile run-time memory may reside (e.g., a cache). The contactless element 308 may be capable of transmitting and receiving wireless data and/or instructions using a short range wireless communications capability (e.g., Near Field Communications).

In some embodiments, the mobile device 300 may include a secure element (not shown) for storing/executing secure applications (e.g., a wallet application) and storing data (e.g., cryptographic data for key management, Personal Account Information, Personal Identification Information, etc.). The secure element may be implemented using a separate secure chip, such as a smart card chip, embedded in the mobile device 300 as a standalone chip or coupled with the contactless element 308. The secure element may also be implemented in a SIM/UICC card, or in an SD card that can be inserted in the mobile device 300.

The display 312 may be used to display messages, images, and other information. In some embodiments, the display 312 may also be configured as a touch screen for the consumer to input or select information. For example, the display 312 may allow the user 101 to enter a PIN or other personal identifier into the mobile device 300.

The speaker 310 may be used to provide audio signals such as prompts to enter a personal identifier into the mobile phone 300. The user 101 may then use the microphone 314 or the display 312 to input the personal identifier into the mobile phone.

The antenna 316 may be used as a means for wireless data transfer to and from the mobile device 300. It will be understood that the mobile device 300 may also include other elements such as a camera, a keypad, a mouse, etc. to support other functions. In one embodiment, a consumer may use a keypad to enter a PIN or other personal identifier into the mobile device 300 in response to an authentication request.

The GPS unit 318 may be configured to detect a location of the mobile device 300 using a Global Positioning System. Note that any suitable location detection mechanism may be used in place of or in addition to the GPS unit 318. For example, the location of the mobile device 300 may also be determined using network based positioning (e.g., using the antenna 316 coupled to the mobile device 300) or a hybrid positioning system. In one embodiment, a network based positioning system may utilize a service provider's network infrastructure to identify the location of the mobile device 300. Some other non-limiting examples to determine the device location may include handset based, SIM-based or WiFi based device tracking.

The mobile application module 320 may comprise code for enabling a consumer to conduct financial transactions such as purchases or money transfers. In one embodiment, the mobile application module 320 may be provided by the service provider and can allow the user to select the goods or services for purchase. The mobile application module 320 may also comprise code for enabling the consumer to initiate a payment with a consumer alias or a mobile phone number. If the consumer has not registered an account number and their consumer alias and/or phone number, then the consumer may be requested to register this information using the mobile application module 320. In one embodiment, the consumer 101 can only authenticate transactions using their registered consumer device or mobile application.

In one embodiment, an authentication application module 314 can be integrated into the service provider's mobile application (e.g., the mobile application module 320) via a software development kit. The authentication application module 314 can include code for providing a secure channel to the authentication computer 112, so that any data transmitted between the authentication application module 314 and the authentication computer 112 is secure. The authentication application module 314 can also include transport encryption keys as well as issuer encryption keys. These keys are described in further detail below. In some cases, the authentication application module 314 may be stored and executed in a secure environment such as a secure element or a trusted execution environment.

In one embodiment, the authentication SDK may be supported by a developer program, test environment and certification service. In one embodiment, the authentication application module 314 can only be activated when certain checks are carried out to establish that the service provider 104 is a trusted provider, and the security of the environment in which the authentication application module 314 may be operating. In one embodiment, the service provider computer 204 may need to comply with security requirements associated with the payment processing network 212 in order for the application module 314 to be integrated with the service provider application.

The operating system 322 may be a collection of software that can manage computer hardware resources and can provide common services for applications. The operating system 322 may be configured to enable the installation and execution of applications on the mobile device 300.

Figure 4:
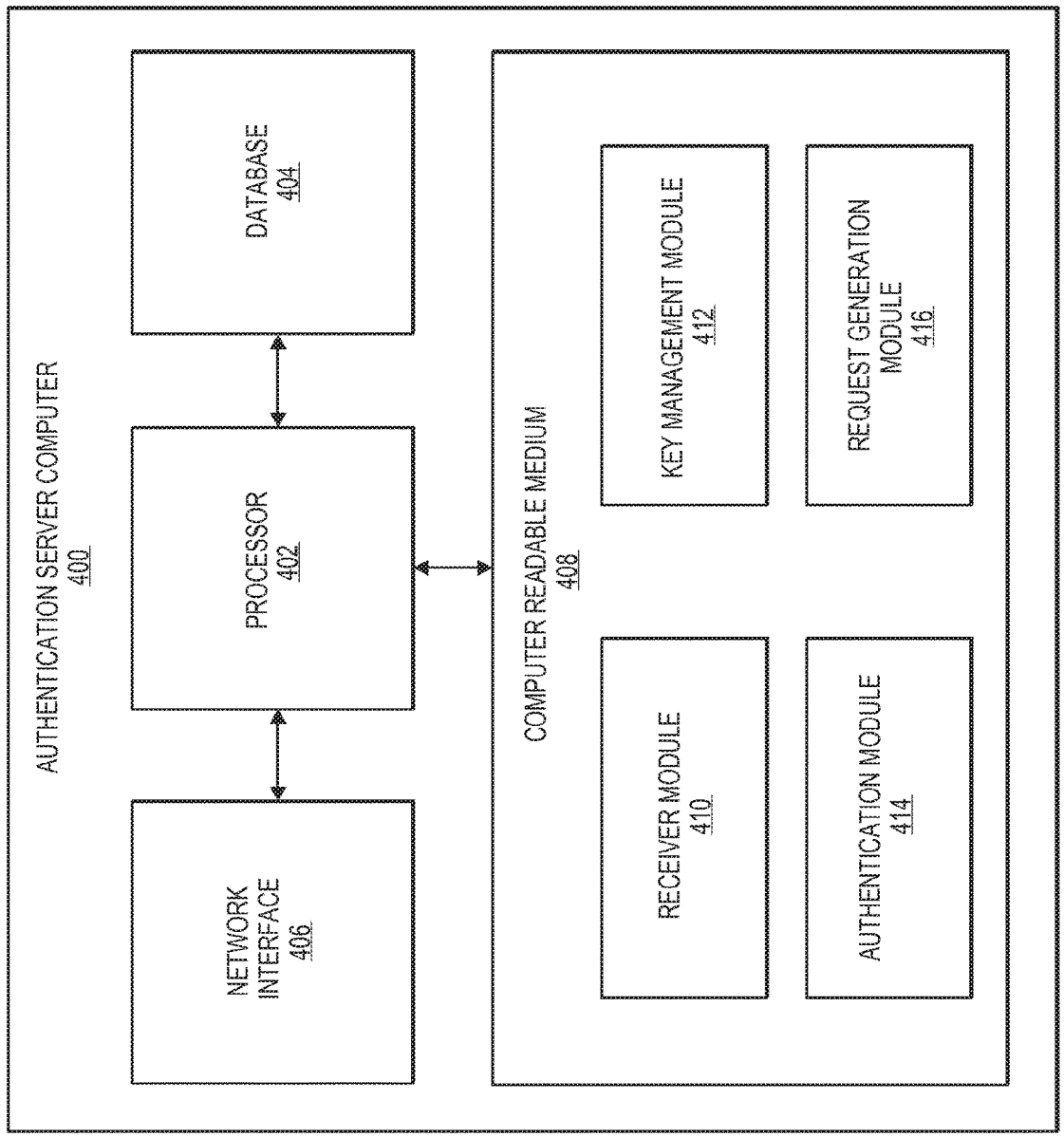
FIG. 4 shows a block diagram of an authentication server computer according to an embodiment of the invention.

FIG. 4 illustrates some of the components of an authentication server computer 400 according to an embodiment of the invention. The authentication server computer 400 may be an example of the authentication computer 112.

The authentication server computer 400 may include a processor 402 communicatively coupled to a database 404, a network interface 406 and a computer readable medium 408.

The network interface 406 may be configured to communicate with the consumer device 102, the service provider computer 112 and other entities (not shown) using one or more communications networks. It may have any of the characteristics of the above described network interfaces.

The database 404 may be coupled to the processor 402. It may be internal or external to the authentication server computer 400. The database 404 may store a consumer's personal and financial information, and information associated with transactions initiated by the consumer. For example, the database 404 may store an account identifier (e.g., a payment account number) associated with a payment account, an expiration date associated with the payment account, a consumer alias associated with the payment account, etc. It may also store transport encryption keys as well as channel encryption keys. These encryption keys are described in further detail below.

The computer readable medium 408 may be in the form of a memory (e.g., flash, ROM, RAM, etc.) and may comprise code, executable by the processor 402 for implementing methods described herein. For example, the computer readable medium 408 may include code implementing a receiver module 410, a key management module 412, an authentication module 414, and/or a request generation module 416.

The receiver module 410 may comprise code for receiving transaction details for a transaction conducted by a consumer or personal identifiers from a consumer device.

The key management module 412 may comprise code for managing encryption keys according to the processes described herein. Encryption keys may include transport keys for encrypting and decrypting a personal identifier of a user, as well as channel encryption keys. In one embodiment, the key management module 412 may be configured to install a first transport key on the consumer device 102 when the authentication application module 314 is first activated on the consumer device 102 or at any other suitable time. It can be paired with the consumer device 102 if desired.

The key management module 412 may manage first and second transport keys. The transport keys provide for the encryption and the secure transmission of the personal identifier from the consumer's device 102 to the authentication computer 106. In some embodiments, the first transport key may be an asymmetric public key and the second transport key may be an asymmetric private key. In other embodiments, the transport keys may be symmetric keys. In one embodiment, the first and second transport keys are implemented as 128 bit DES (Data Encryption Standard) or Triple DES keys. Authentication channel keys, which are described in detail below, may use encryption processes that are similar to or different from those used with the transport keys.

In some embodiments, the authentication module 414 may comprise code for causing the processor 402 to determine that the personal identifier received by the receiver module 410 matches a previously stored personal identifier for the consumer and generate an authentication indicator indicating a authentication result. The authentication module 414 may also comprise code for generating a digital certificate for every transaction. In one embodiment, the issuer may provide an issuer key for the generation of the digital certificate.

The authentication module 414 may be configured to provide authentication APIs that can allow the service provider's core system to securely connect to the payment processing network 212. In one embodiment, the authentication APIs may allow the service provider computer 104 to perform functions such as: providing and receiving consumer alias/mobile phone number/payment account details, receiving shared secrets, providing transaction authorization, receiving digital certificates, receiving encrypted PINs, providing authorization response data, and allowing administrative and reporting access.

The request generation module 416 may also comprise code for generating an authentication request message to request that the user enter a personal identifier into the consumer device 102. The request generation module 416 may also comprise code for generating a personal identifier verification request message after receiving the personal identifier from the consumer device 102.

II. Exemplary Methods

Some specific methods according to embodiments of the invention can now be described. In one embodiment, the method includes using one of a plurality of personal identification authentication processes to perform an authentication process for a personal identifier for a user. The method includes receiving, at a server computer, an authentication request message for a transaction from an authentication computer. The authentication request message comprises a personal identifier of a user. In response to receiving the authentication request message, the server computer determines a personal identification authentication process to perform. The personal identification authentication process can be one of a plurality of personal identification authentication processes. The server computer then performs the determined personal identification authentication process.

Any suitable personal identification authentication process can be included in the plurality of personal identification authentication processes. For example, the plurality of personal identification authentication processes may include at least first, second, and a third personal identification authentication processes. Although three different authentication processes are described, it is understood that embodiments of the invention may include any other authentication processes.

An exemplary first authentication process may comprise verifying that the received personal identifier matches a stored personal identifier, generating an authentication indicator when the received personal identifier matches the stored personal identifier, and transmitting the generated authentication indicator to the authentication computer.

An exemplary second authentication process may comprise storing the personal identifier in a database, generating the authentication indicator, forwarding the authentication indicator to the authentication computer, which then transmits the authentication indicator and a primary account identifier to a service provider computer, receiving an authorization request message comprising a primary account identifier and the authentication indicator from the service provider computer, retrieving the personal identifier from the database, modifying the authorization request message to include the personal identifier, and transmitting the authorization request message to an issuer computer, where the issuer computer authenticates the personal identifier.

An exemplary third authentication process comprises a third authentication process comprising generating an authorization request message comprising the personal identifier and an amount data field, where the amount data field does not contain an amount or contains a zero dollar amount, transmitting the authorization request message to an issuer computer, and receiving an authorization response message comprising authentication result data.

Yet another authentication process could be simply having the authentication computer 112 verify the received personal identifier, without generating a personal identifier verification request message.

The determination of which authentication process to perform can depend on a number of different factors. Such factors may include the processing preferences of the particular issuer and the determination as to whether the transaction will be performed by a particular payment processing network.

Prior to conducting any transactions, the user 100 may register with the authentication computer 112. When registering, the user 100 may use the consumer device 102 to provide information such as the user's mobile phone number, any desired account alias, any payment account or accounts that the user wants to register, and any other account details. Other account details may include the account number, the CVV2 value, and the expiration date associated with a particular account. FIG. 9A illustrates a display message 902 for registration of a payment account using consumer device in the form of a mobile device 300.

Referring to FIGS. 1-5, after registering, a user 100 may use the system 100 to conduct payment transactions. In the examples below, a personal identifier in the form of a PIN is used to authenticate the user 101. Embodiments of the invention are not limited thereto and other personal identifiers may be used instead of or in addition to the PIN. Other exemplary transactions may include money transfer transactions, account balance inquiries, etc.

Figure 5:
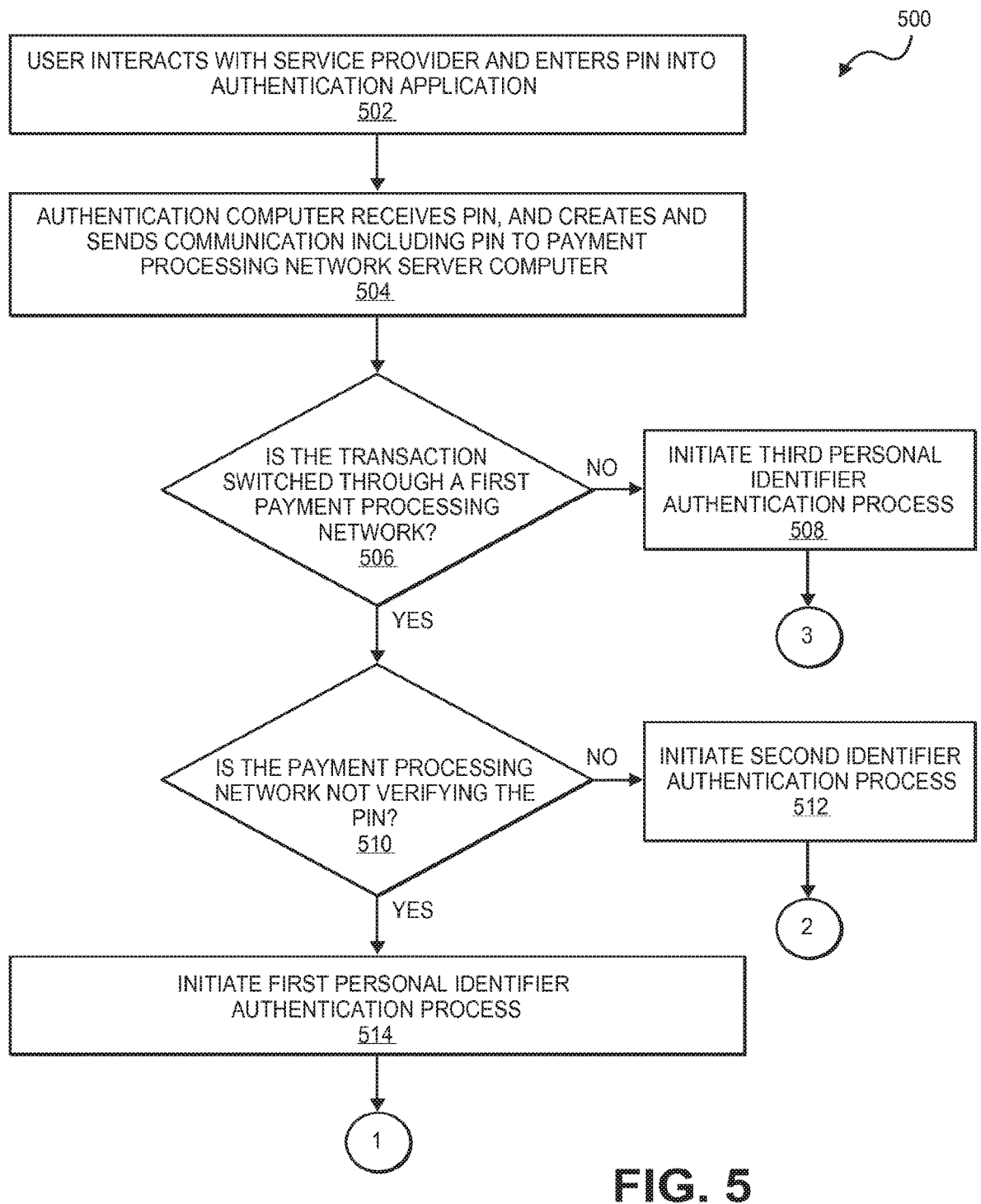
FIG. 5 shows a flowchart illustrating a method according to an embodiment of the invention.

In step 502 in FIG. 5, a user may interact with the service provider computer 104, and may subsequently enter a personal identifier such as a PIN into an authentication application on the consumer device 102. For example, the user may select goods at a host site associated with the service provider computer 104 using the consumer device 102. The consumer device 102 and the service provider computer 104 can communicate using any suitable communication channel including PC/Internet portals, IVR, SMS or USSD messages, phone calls to merchant, etc.

While remote transactions are discussed in detail, the transactions in embodiments of the invention are not limited to remote transactions. Embodiments of the invention can be conducted at a physical or mobile point of sale. For example, embodiments of the invention can be conducted at brick and mortar stores where the consumer device is a mobile phone which interacts with a merchant's POS (point of sale) device.

During the interaction, the consumer device 102 may provide the service provider computer 104 with certain transaction details. For example, the transaction details may include the consumer's mobile phone number, payment device or account type (e.g., card type), the consumer's name, etc. In some embodiments, the transaction details may include geo-location data, time and date of the transaction, items selected for purchase by the user 101, etc.

If only an alias or phone number is provided to the service provider computer 104, then the service provider computer 104 may access the account on file system 104 to obtain the PAN (or payment token) and other payment credentials associated with the alias or phone number.

The transaction details provided by the consumer device 102 and any appropriate additional transaction details generated by the service provider computer 104 may then be transmitted to the authentication computer 112. Such additional transaction details could include the PAN, the amount of the transaction, and the merchant name.

In response to the interaction between the consumer device 102 and the service provider computer 104, the authentication computer 112 may then send an authentication request message to the consumer device 102. The authentication request message may be sent to the consumer device 102 in any suitable manner including e-mail, SMS messaging, instant messaging, through the authentication application, etc.

Once the authentication request message is received at the consumer device 102, the user 101 may then enter their PIN into an authentication application on the consumer device 102. During the PIN acquisition process, the consumer device 102 may collect other authentication information along with PIN. Other authentication information may include consumer device information such as the geo-location of the consumer device 102 and any identifiers associated with the consumer device (e.g., a secure element identifier, IMEI number, SIM card number, etc.). Other authentication information may also include other personal identification information such as a home address of the user, the names of the user's children or pets, the user's mother's maiden name, etc.

Figure 9B:
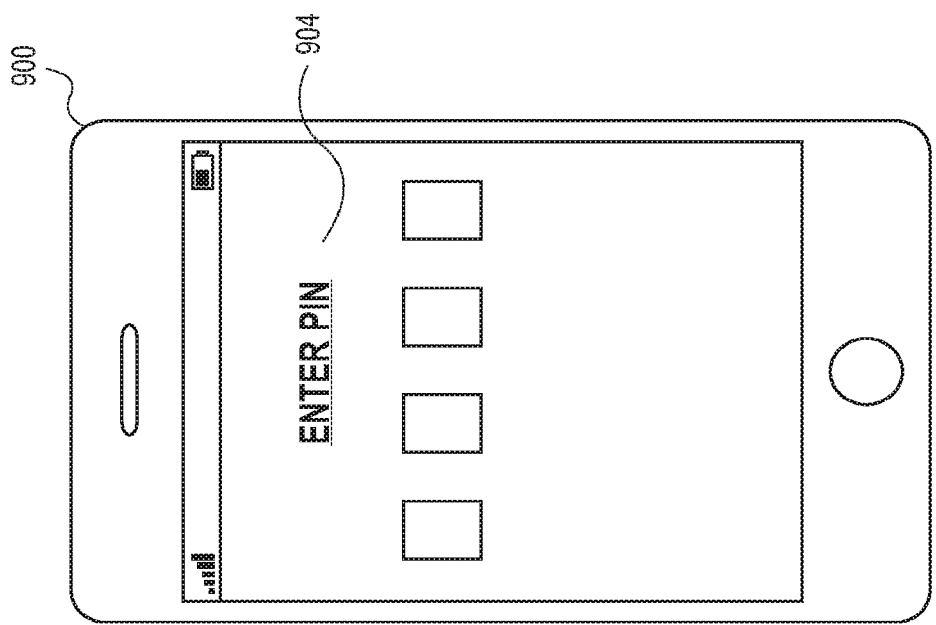
FIGS. 9A and 9B respectively show mobile devices with screenshots including a registration page and a user interface for entering a PIN.
Figure 9A:
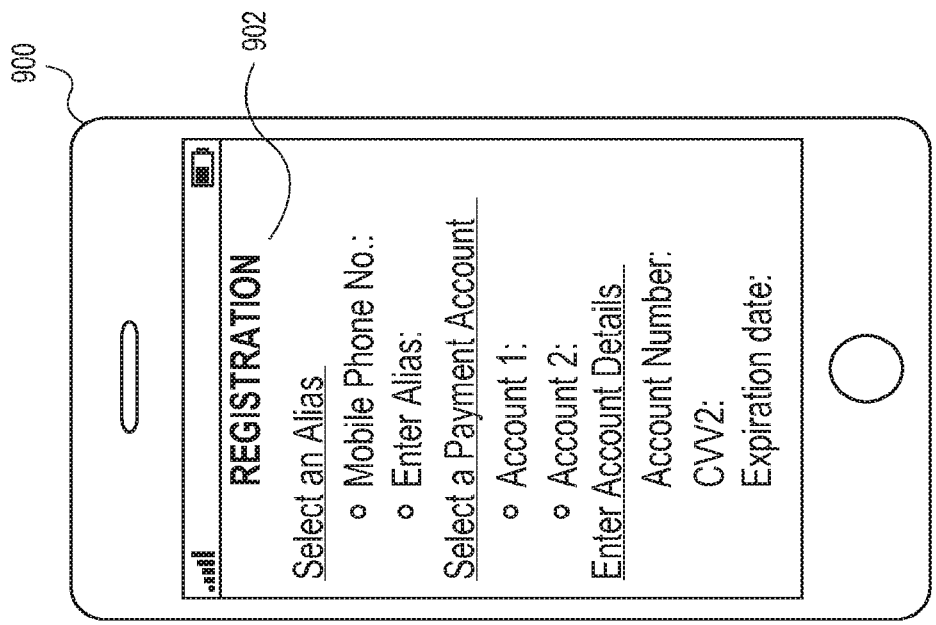

As an illustration, FIG. 9B illustrates a display message 604 on the mobile device 300 to enter a PIN. For example, the display message 604 may be displayed in response to an authentication request that is received by the mobile device 300. In one embodiment, the PIN may include four digits. However, it will be understood that any suitable personal identifier may be used in place of the PIN.

To provide for the secure transmission of the PIN to the appropriate authenticating entity, a number of encryption keys pairs may be used in the PIN verification process. The encryption key pairs may be associated with symmetric encryption processes. Any suitable symmetric encryption process including DES (dynamic encryption standard) or triple DES may be used in embodiments of the invention.

Once the PIN is received by the authentication application on the consumer device 102, it may first be encrypted by a first encryption key associated with the authentication application to create a single encrypted PIN. The first encryption key may be an issuer key and may be stored on the consumer device 102. The issuer key may be a DUKPT (derived unique key per transaction) key. DUKPT is a key management scheme that uses one time encryption keys that are derived from a secret master key that is shared by the entity (or device) that encrypts and the entity (or device) that decrypts the data.

After the PIN is encrypted with the first encryption key of the first encryption key pair, the single encrypted PIN is then encrypted again with a second encryption key of a second encryption key pair. The second encryption key may be a transport key. The transport key may be used to secure the transmission of data between the consumer device 102 and the authentication server computer 112. The double encrypted PIN is then transmitted by the consumer device 102 to the authentication computer 112 and is received at the authentication computer 112 (step 504).

In step 504, after the double encrypted PIN is received at the authentication computer 112, the authentication computer 112 decrypts the double encrypted PIN using another second transport encryption key stored in the authentication computer 112. Once the double encrypted PIN is de-encrypted with the second transport encryption key to obtain the single encrypted PIN, the authentication computer 112 generates a personal identifier verification request message and transmits the single encrypted PIN to the payment processing network 108.

In some embodiments, instead of sending the single encrypted PIN in the personal identifier verification request message, the authentication computer 112 may encrypt the single encrypted PIN with a third encryption key of a third encryption key pair, which may be an authentication channel key to form another double encrypted PIN. The third encryption key pair protects data transmitted between the authentication computer 112 and the payment processing network 108 (or other entity in the system). The authentication channel key may be stored in the authentication computer 112. A corresponding third authentication channel key may be stored at the payment processing network 108. After the payment processing network 108 receives the double encrypted PIN from the authentication computer 112, the payment processing network 112 may decrypt the double encrypted PIN to the single encrypted PIN before passing it on to the issuer computer 110.

The personal identifier verification request message may be in any suitable form. For example, the personal identifier verification request message may in the form of a standard authorization request message such as an ISO 8583 message. Such messages include a PAN (primary account number), a transaction amount, a CVV (card verification value), service code, merchant category code, and other information. In such embodiments, since the authentication computer 112 is not requesting authorization for a specific transaction amount in this communication, the authentication computer may create and transmit a zero dollar or no amount authorization request message to the payment processing network 108. The zero or no dollar authorization request message may include an indicator indicating that the authorization request message is for a PIN-type transaction and the encrypted PIN may be included in a PIN data field in the authorization request message. The authorization request message may also have any suitable routing or transaction processing preferences associated with the particular transaction or the service provider.

Once the personal identifier verification request message is received by the payment processing network 108, it can then perform an analysis on the received information to determine which authentication process to perform. The selection is the particular authentication process can be based on a number of factors such as the level of assurance desired and the speed of processing given the particular circumstances of the transaction. The decision blocks associated with steps 506 and 510 in FIG. 5 may form part of a decision hierarchy to determining which type of authentication processing to perform for a particular transaction.

In step 506, the first payment processing network 108 may determine if the transaction will be switched through the first payment processing network 108 or a different payment processing network. In some embodiments, this may be determined based on a pre-selection process by either the user 101 or the service provider associated with the service provider computer 104. For example, the database 204 in the payment processing network server computer 200 may store data indicating a preference for processing a transaction through the second payment processing network 109 instead of the first payment processing network 108 when certain PANs are used or when certain service providers are involved in the transactions. This information may be provided to the payment processing network server computer 200 by the user 101 and/or the service provider using any suitable client computer(s).

In step 508, if the transaction that is being conducted will not use the first payment processing network 108 to obtain actual authorization for the transaction by routing the actual payment transaction to the issuer computer 110, then a third personal identifier verification process is performed.

In step 510, if the transaction will be switched through the first payment processing network 108, then a further determination is made as to whether the first payment processing network 108 will verify the PIN on behalf of the issuer.

In step 512, if the PIN will not be verified by the first payment processing network 108 on behalf of the issuer, then a second personal identifier verification process may be performed.

In step 514, if the PIN will be verified by the first payment processing network 108 on behalf of the issuer, then a first personal identifier verification process may be performed.

Although three specific personal identifier verification processes are described in this illustration, it is understood and two more authentication processes list of available authentication processes. Further, the specific types of authentication processes performed are not limited to those that are specifically described.

Figure 6:
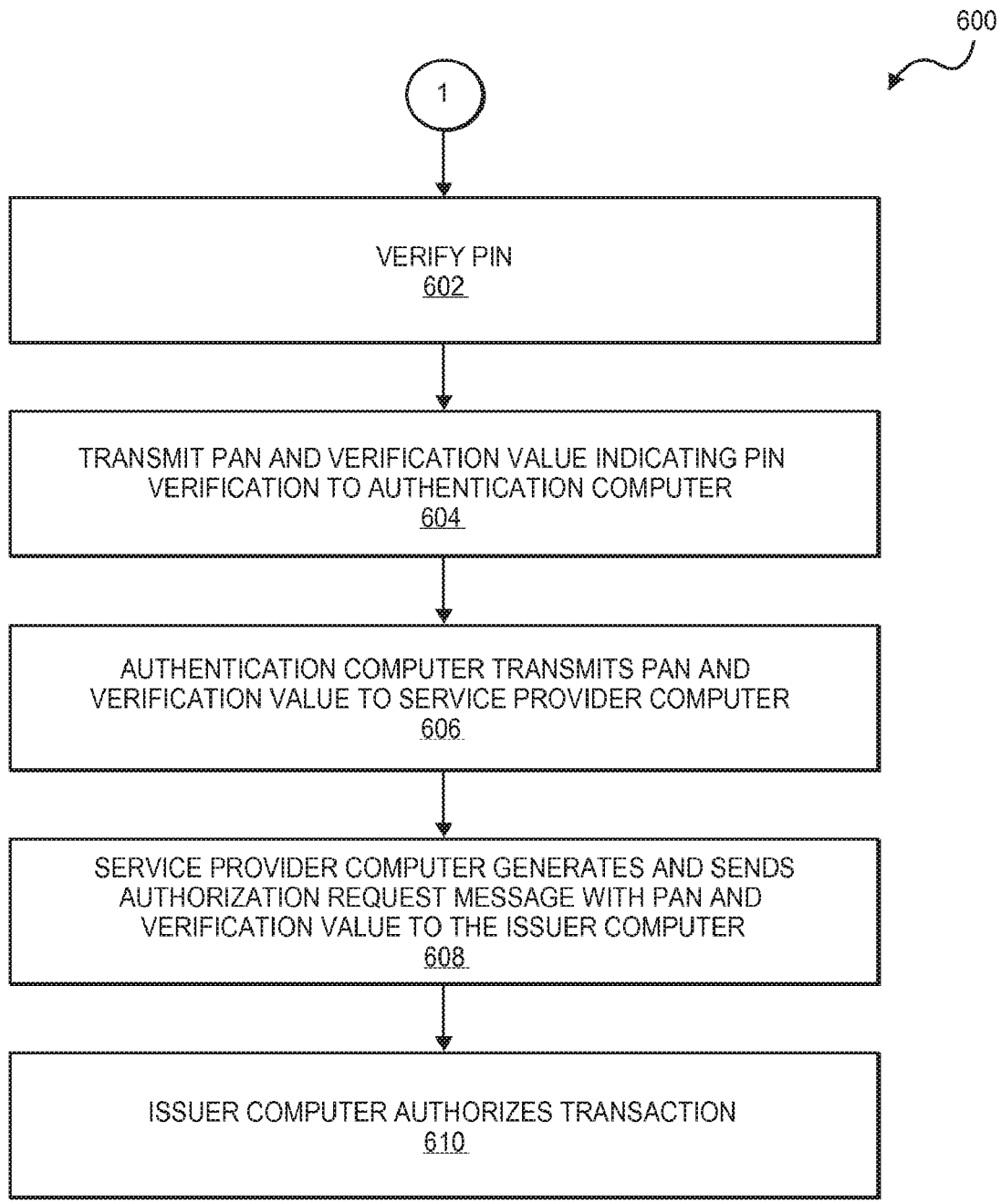
FIG. 6 shows a flowchart illustrating a first personal identifier verification process according to an embodiment of the invention.

FIG. 6 illustrates an exemplary first personal identifier verification process according to an embodiment of the invention. The first personal identifier verification process comprises verifying, by the payment processing network server computer, that the received personal identifier matches a stored personal identifier. The payment processing network server computer may act on behalf of the issuer or another entity. The first personal identifier verification process also comprises generating an authentication indicator such as an authentication verification value when the received personal identifier matches the stored personal identifier. After the authentication indicator is generated by the payment processing network, it is transmitted to the authentication computer.

An example of an authentication indicator is a verification value such as a CAVV (card verification value) or AAV (account holder authentication value). A CAVV is a cryptographic value derived by the issuer during authentication that can provide evidence of the results of payment authentication during a purchase. The CAVV may be signed by an issuer or other authorized party.

In some embodiments, an ECI (electronic commerce indicator) may also be returned with the CAVV value. It indicates the level of security used when the user provided payment information to the service provider. It can provide an indication of the authentication results and the characteristics of the transaction (e.g., whether the user was actually authenticated, whether authentication was attempted but not completed, whether the authentication process was conducted over a secure channel, etc.).

In step 602, the payment processing network 108 recognizes that the personal identifier verification request message is for a PIN authentication type transaction and undertakes PIN authentication. For example, the payment processing network 108 may determine that the transaction is a PIN authentication type transaction based on the transaction identifier included in the personal identifier verification request message received from the authentication computer 112. In one embodiment, the payment processing network 108 may compare the PIN included in the PIN authentication message with a PIN stored in a database in the payment processing network 108. If the PIN that is received from the authentication computer 112 is the same as the PIN stored in the database, then the payment processing network 108 may generate an authentication indicator such as a CAVV. If the received PIN does not match the PIN that is stored in the payment processing network 108, then the payment processing network 108 may generate and send the appropriate authentication indicator indicating that the PIN was not verified.

In step 604, the payment processing network 108 responds to the authentication computer 112 and transmits the PAN (Primary Account Number) and the generated authentication indicator to the authentication computer 104.

In step 606, after the service provider computer 104 receives the PAN and the authentication indicator, the authentication computer 112 transmits the PAN and the authentication indicator (and optionally the electronic commerce indicator) to the service provider application on the consumer device 102, and the consumer device 102 may then provide this information to the service provider computer 104. In other embodiments, the authentication computer 112 can send the authentication indicator directly to the service provider computer 104 or even the acquirer computer 106. The service provider computer 104 or the acquirer computer 106 can generate an appropriate authorization request message including the PAN, transaction amount, and the authentication indicator.

In step 608, the service provider computer 104 generates and submits an authorization request message with the PAN and the authentication indicator to the issuer computer 110. The authentication indicator indicates that the issuer previously authenticated the user.

In step 610, the issuer computer 110 can then receive the authorization request message and can analyze the authorization request message. It can then authorize the transaction if the account used to conduct the transaction has sufficient funds and/or credit, and the transaction presents an acceptable level of risk to the issuer. The issuer computer 110 may use the authentication indicator as data to determine if the level of risk is acceptable. For example, since the PIN was verified by the payment processing network 108, it is likely that the transaction is not fraudulent since only the authentic user 101 knows the real PIN. After determining whether or not the transaction is authorized, the issuer computer 110 may transmit an authorization response message back to the service provider computer 104 via the first payment processing network 108 and the acquirer computer 106.

At the end of the day, a clearing and settlement process can occur between the acquirer computer 106, the first payment processing network 108, and the issuer computer 110.

The first authentication process that is described above can be faster than the second and third personal identifier verification processes described below. If the circumstances of the transaction allow it (e.g., the issuer allows for stand in processing by the payment processing network and the transaction is not switched through a different payment processing network), then the first authentication process is preferred over the second and third personal identifier verification processes.

Figure 7:
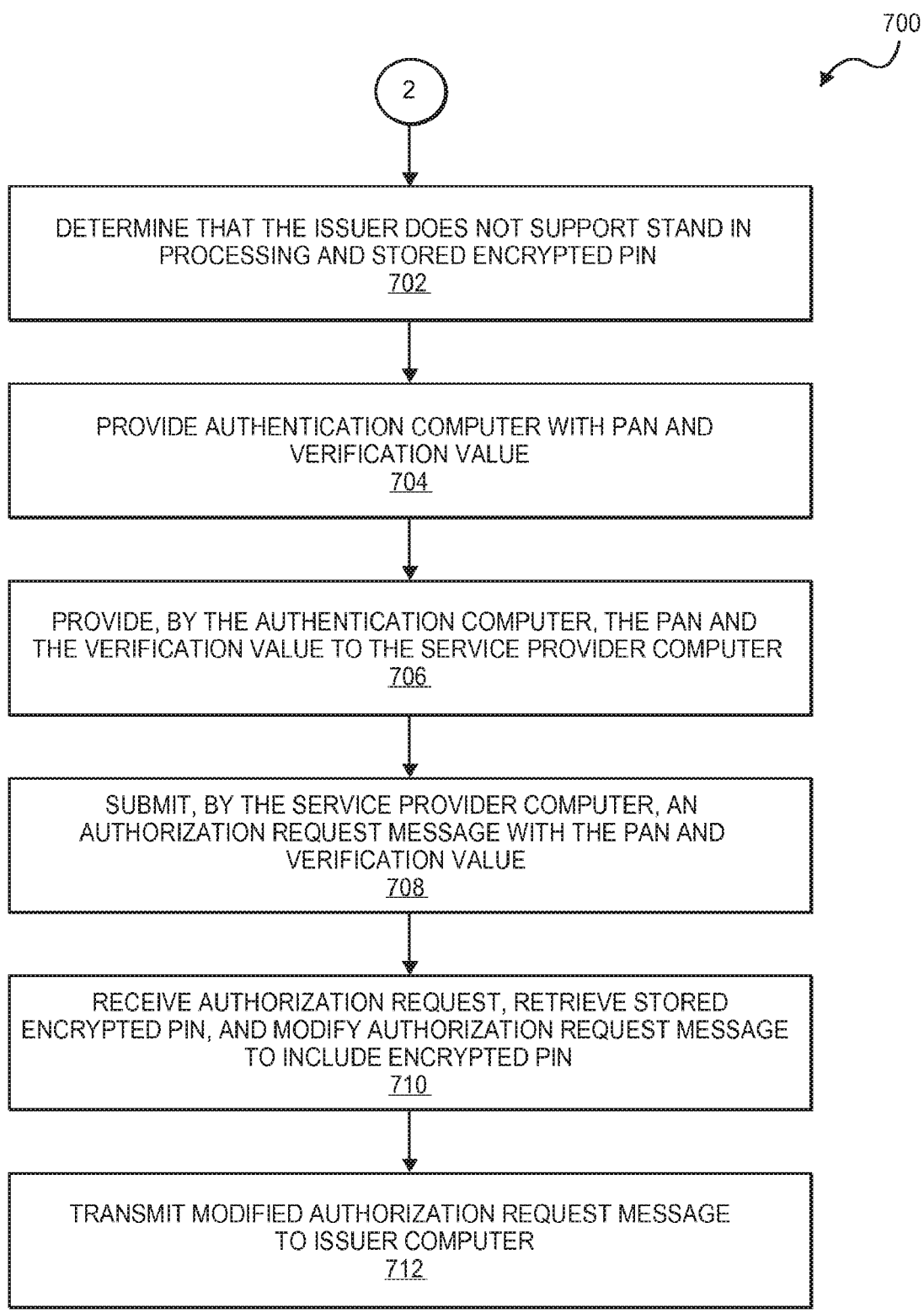
FIG. 7 shows a flowchart illustrating a second personal identifier verification process according to an embodiment of the invention.

FIG. 7 illustrates a flowchart for a second personal identifier verification process. In the second authentication process, after receiving the personal identifier from the authentication server computer 104, the personal identifier received from the user is stored in a database at the payment processing network. A server computer in the payment processing network generates an authentication indicator and then forwards it to the authentication computer. After the authentication indicator is generated, the authentication computer then transmits the authentication indicator to the consumer device 102 or the service provider computer 104. At a later time, the server computer receives an authorization request message comprising a primary account identifier and the authentication indicator from the service provider computer, retrieves the personal identifier from the database, modifies the authorization request message to include the personal identifier, and transmits the authorization request message to an issuer computer. The issuer computer thereafter authenticates the personal identifier.

In step 702, after the first payment processing network 108 receives the encrypted PIN from the authentication computer 112, the first payment processing network 108 recognizes that the transaction being conducted is a PIN authentication type transaction. The payment processing network 108 may analyze the PAN and may determine that the issuer associated with the PAN does not allow the payment processing network to authenticate PINs associated with its accounts. Consequently, instead of verifying the PIN, the payment processing network 108 may temporarily store the encrypted PIN within the payment processing network 108 (e.g., in the database 204 in FIG. 2).

In step 704, the first payment processing network 108 transmits the PAN and the authentication indicator back to the authentication computer 112.

In step 706, after receiving the PAN and the authentication indicator from the payment processing network 108, the authentication computer 112 transmits the PAN and the authentication indicator to the consumer device 102, or directly to the service provider computer 104. The data that is transmitted between the payment processing network 108 and the authentication computer 112 may be encrypted with appropriate encryption keys.

In step 708, after receiving the PAN and the authentication indicator, the service provider computer 104 generates and transmits an authorization request message with the PAN and the indicator to the first payment processing network 108, via the acquirer computer 106.

In step 710, after receiving the authorization request message, the first payment processing network 108 recognizes the authentication indicator (e.g., CAVV) and the authorization request message based on certain parameters (e.g., card number, expiration date, merchant ID, time, transaction ID, etc.). It then retrieves the encrypted PIN from the database in the first payment processing network 108, and then modifies the authorization request message to include the encrypted PIN. The first payment processing network 108 then transmits the PAN and the encrypted PIN to the issuer computer 110 for authorization.

The issuer computer 110 can then receive the authorization request message and can then authorize the transaction. The issuer computer 110 may analyze the authorization request message and may determine if the account associated with the PAN in the authorization request message has sufficient funds and if the transaction has an acceptable level of risk. After this determination, the issuer computer 110 may send an authorization response message back to the service provider computer 104 via the first payment processing network 108 and the acquirer computer 106.

At the end of the day, a clearing and settlement process can occur between the acquirer computer 106, the first payment processing network 108, and the issuer computer 110.

Figure 8:
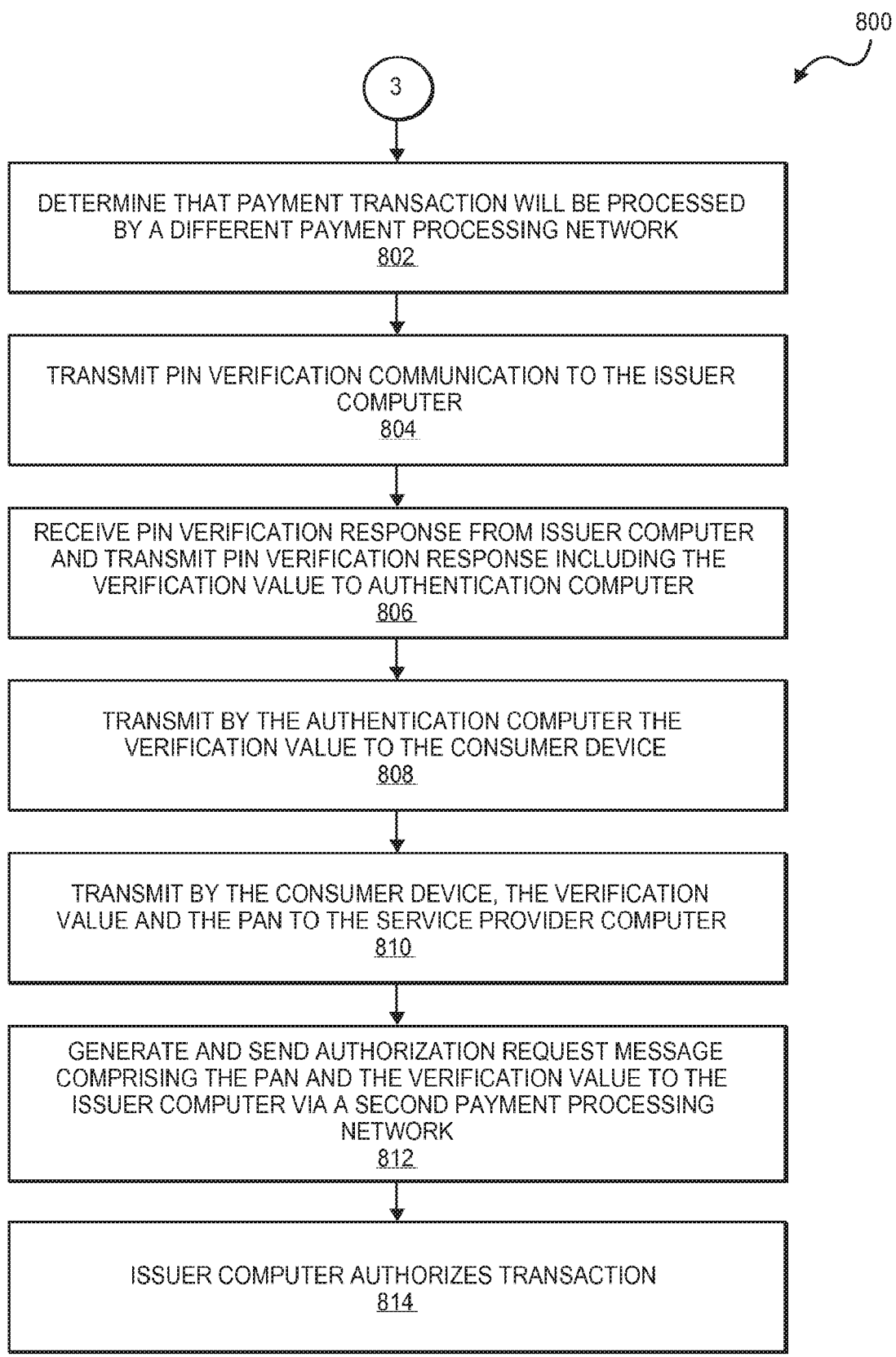
FIG. 8 shows a flowchart illustrating a third personal identifier verification process according to an embodiment of the invention.

FIG. 8 illustrates an example of a third personal identifier verification process according to an embodiment of the invention. The authentication process comprising generating an authorization request message comprising the personal identifier and an amount data field, where the amount data field does not contain an amount or contains a zero dollar amount, transmitting the authorization request message to an issuer computer, and receiving an authorization response message comprising authentication result data. In the subsequent payment authorization, the authorization request message that is used to conduct the actual transaction is routed through the second payment processing network 109 instead of the first payment processing network 108.

In step 802, the first payment processing network 108 recognizes the transaction that is being conducted is a PIN authenticated type transaction and that the authorization and settlement parts of the transaction will not be conducted using the first payment processing network 108.

In step 804, after receiving the encrypted PIN, the first payment processing network 108 transmits a personal identifier verification request message to the issuer computer 110. In some embodiments, personal identifier verification request may be in the form of a zero dollar or no amount authorization request message. The personal identifier verification request message is then received by the issuer computer 110. The issuer computer 110 verifies the PIN and returns an authentication result indicating whether or not the PIN is or is not valid.

In step 806, after the first payment processing network 108 receives a response to the personal identification verification request from the issuer computer 110, the first payment processing network 108 may generate an authentication indictor (e.g., a CAVV value) as in the first and second authentication processes. After generating the authentication indicator, the first payment processing network 108 may transmit the authentication indicator along with the PAN to the authentication computer 112.

In step 808, after receiving the authentication indicator and the PAN, the authentication computer 112 transmits the PAN and the authentication indicator to the consumer device 102. Alternatively, the authentication computer 112 may transmit the PAN directly to the service provider computer 104 or to the acquirer computer 106 instead of the consumer device 102.

In step 810, after receiving the PAN and the authentication indicator, the consumer device 102 transmits the PAN and the authentication indicator to the service provider computer 104.

In step 812, the service provider computer 104 then generates and transmits an authorization request message comprising the amount of the transaction, the authentication indicator, the PAN, and optionally the encrypted PIN to the issuer computer 110 via the acquirer computer 106 and the second payment processing network 109. In this process, the authorization request message does not pass through the first payment processing network 108.

The issuer computer 110 can then receive the authorization request message and can then authorize the transaction. The issuer computer 110 may then analyze the authorization request message to determine if the account associated with the PAN has sufficient funds and if the transaction is of acceptable risk. It can thereafter send an authorization response message back to the service provider computer 104 via second first payment processing network 108 and the acquirer computer 106.

At the end of the day, a clearing and settlement process can occur between the acquirer computer 106, the second payment processing network 108, and the issuer computer 110.

The third personal identifier verification process can take more time than the above-described first and second personal identifier verification processes since the authentication communications are transmitted back to the issuer computer 110, prior to performing the authorization portion of the transaction.

Embodiments of the invention have a number of benefits. The hierarchy of processes can be designed to provide minimal transaction times for the majority of transactions. PIN authentication can be performed almost instantaneously at the payment processing network, hence, is the preferred option in the hierarchy. Further, embodiments of the invention enable the PIN to be authenticated independently of the merchant. Further, the transaction that is being conducted is very secure, since the PAN need not be stored on the consumer device 102 making the account less vulnerable to attacks on the consumer device. Lastly, the encryption process described above allows for the secure transmission of sensitive personal identification data between the various components shown in FIG. 1.

The various participants and elements described herein with reference to FIG. 1 may operate one or more computer apparatuses to facilitate the functions described herein. Any of the elements in FIG. 1, including any servers or databases, may use any suitable number of subsystems to facilitate the functions described herein.

Figure 10:
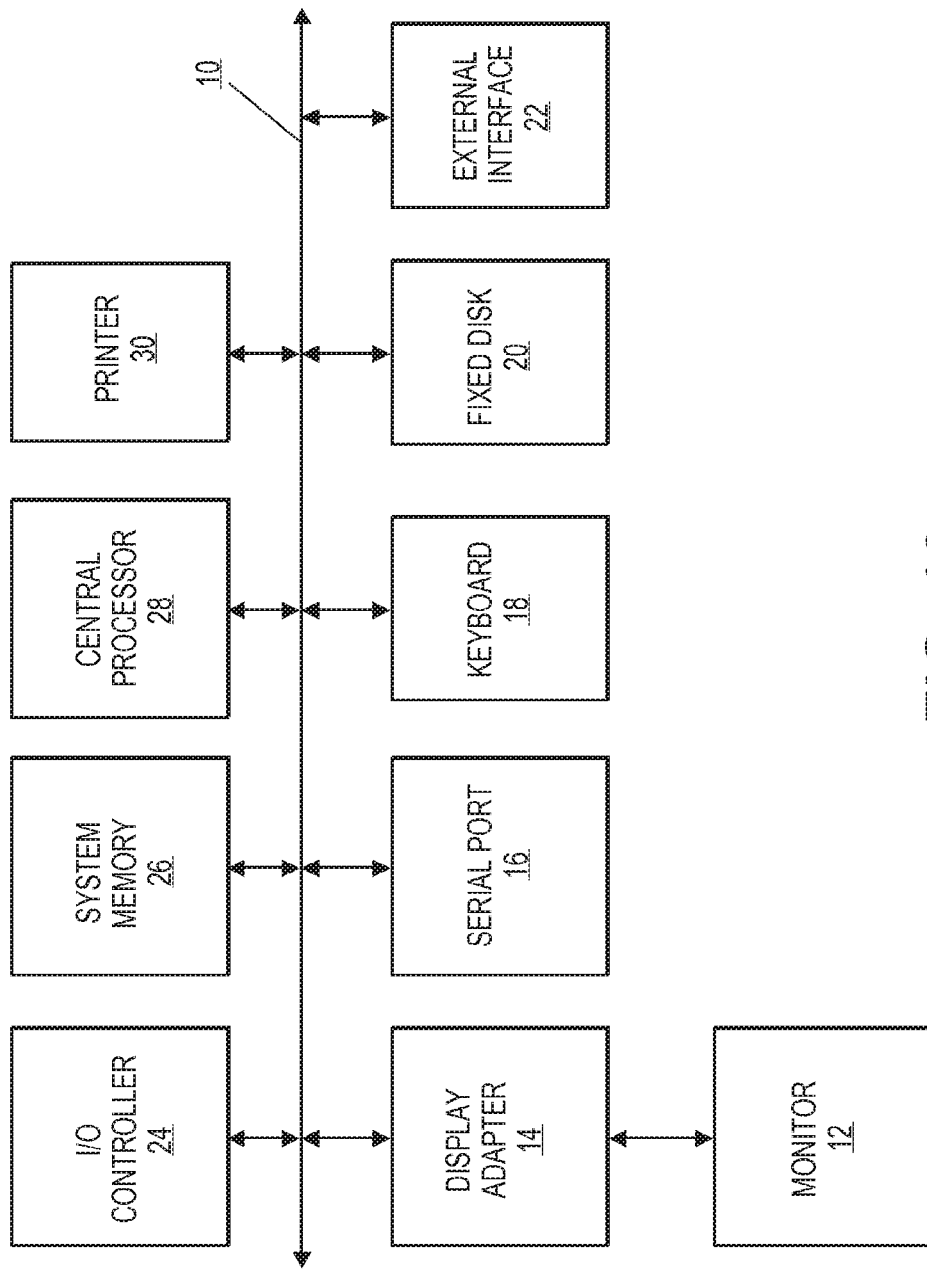
FIG. 10 is a block diagram of a computer apparatus.

Examples of such subsystems or components are shown in FIG. 10. The subsystems shown in FIG. 10 are interconnected via a system bus 10. Additional subsystems such as a printer 30, keyboard 18, fixed disk 20 (or other memory comprising computer readable media), monitor 12, which is coupled to display adapter 14, and others are shown. Peripherals and input/output (I/O) devices, which couple to I/O controller 24 (which can be a processor or other suitable controller), can be connected to the computer system by any number of means known in the art, such as serial port 16. For example, serial port 16 or external interface 22 can be used to connect the computer apparatus to a wide area network such as the Internet, a mouse input device, or a scanner. The interconnection via system bus allows the central processor 28 to communicate with each subsystem and to control the execution of instructions from system memory 26 or the fixed disk 20, as well as the exchange of information between subsystems. The system memory 26 and/or the fixed disk 20 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although PANs are discussed in detail, it is understood that payment tokens may be used instead of PANs.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, at a server computer and during a first transaction that uses a first account of a first user, a first personal identifier verification request message from an authentication computer, wherein the first personal identifier verification request message comprises a first personal identifier of the first user;
   in response to receiving the first personal identifier verification request message,
   determining, by the server computer, a first level of assurance required by at least one of the authentication computer or the server computer;
   based on the first level of assurance, selecting, by the server computer from among a plurality of authentication processes comprising a first authentication process and a second authentication process, the first authentication process;
   wherein the first authentication process comprises verifying that a received personal identifier of a user matches a stored personal identifier of the user, generating a first authentication indicator when the received personal identifier of the user matches the stored personal identifier of the user, and transmitting the generated first authentication indicator to the authentication computer, and
   the second authentication process comprises storing an encrypted personal identifier of the user in a database, generating a second authentication indicator without performing a matching of personal identifiers, forwarding the second authentication indicator to the authentication computer, which then transmits the second authentication indicator and a primary account identifier to a service provider computer, receiving an authorization request message comprising the primary account identifier and the second authentication indicator from the service provider computer, retrieving the encrypted personal identifier of the user from the database, modifying the authorization request message to replace the second authentication indicator with the encrypted personal identifier of the user, and transmitting the authorization request message to an issuer computer which receives the encrypted personal identifier of the user, where the issuer computer verifies that the received encrypted personal identifier of the first user is authentic;
   performing, by the server computer, the first authentication process in response to determining, by the server computer, the first authentication process to perform from among the plurality of authentication processes;
   generating and transmitting, by the server computer, the first authentication indicator to the authentication computer, wherein the issuer computer authorizes the first transaction at least based on the first authentication indicator;
   receiving, at the server computer and during a second transaction that uses a second account of a second user, a second personal identifier verification request message from the authentication computer, wherein the second personal identifier verification request message comprises a second personal identifier of the second user;
   in response to receiving the second personal identifier verification request message, determining, by the server computer, a second level of assurance required by at least one of the authentication computer or the server computer, the second level of assurance being higher than the first level of assurance;
   based on the second level of assurance:
      determining, by the server computer, that the first authentication process is unsuitable, and
      selecting, by the server computer, the second authentication process as satisfying a required authentication process, the second authentication process being slower than the first authentication process;
      performing, by the server computer, the second authentication process in response to determining, by the server computer, the second authentication process to perform from among the plurality of authentication processes;
      receiving, by the server computer, a transaction authorization request message for the second transaction; and
      modifying, by the server computer, the transaction authorization request message to insert an encrypted second personal identifier of the second user stored by the server computer, and transmitting the transaction authorization request message to the issuer computer, wherein the issuer computer authorizes the second transaction based on information provided in the transaction authorization request message.

2. The method of claim 1, wherein the first personal identifier of the first user is encrypted and is an encrypted PIN.

3. The method of claim 1, wherein the server computer is in a payment processing network.

4. The method of claim 1, wherein the method further comprises:
receiving a first authorization response message from the issuer computer; and
transmitting the first authorization response message to the service provider computer.

5. The method of claim 1, wherein determining, by the server computer, the first authentication process to perform comprises analyzing issuer data and payment network data associated with the first personal identifier verification request message.

6. The method of claim 1 wherein the first personal identifier verification request message is an ISO 8583 message including a PAN, transaction amount, and CVV.

7. The method of claim 1, further comprising, prior to receiving the second personal identifier verification request message:
receiving, at the authentication computer, the second personal identifier of the second user from a consumer device, after the second user interacts with the service provider computer.

8. The method of claim 1, wherein the service provider computer is a merchant computer, and the server computer is in a payment processing network.

9. The method of claim 1, wherein the first personal identifier of the first user, and the second personal identifier of the second user is each a biometric identifier.

10. The method of claim 1, wherein the first personal identifier verification request message is an ISO 8583 message including a PAN, transaction amount, and CVV originating from a point of sale terminal and passes through an acquirer computer.

11. A server computer comprising a processor, and a computer readable medium coupled to the processor, the computer readable medium comprising code, for causing the processor to implement a method comprising:
receiving, during a first transaction that uses a first account of a first user, a first personal identifier verification request message from an authentication computer, wherein the first personal identifier verification request message comprises a first personal identifier of the first user;
in response to receiving the first personal identifier verification request message,
determining a first level of assurance required by at least one of the authentication computer or the server computer,
based on the first level of assurance, selecting, from among a plurality of authentication processes comprising a first authentication process and a second authentication process, the first authentication process,
wherein the first authentication process comprises verifying that a received personal identifier of a user matches a stored personal identifier of the user, generating a first authentication indicator when the received personal identifier of the user matches the stored personal identifier of the user, and transmitting the generated first authentication indicator to the authentication computer,
the second authentication process comprises storing an encrypted personal identifier of the user in a database, generating a second authentication indicator without performing a matching of personal identifiers, forwarding the second authentication indicator to the authentication computer, which then transmits the second authentication indicator and a primary account identifier to a service provider computer, receiving an authorization request message comprising the primary account identifier and the second authentication indicator from the service provider computer, retrieving the encrypted personal identifier of the user from the database, modifying the authorization request message to replace the second authentication indicator with the encrypted personal identifier of the user, and transmitting the authorization request message to an issuer computer which receives the encrypted personal identifier of the user, where the issuer computer verifies that the received encrypted personal identifier of the user is authentic,
performing the first authentication process in response to determining, by the server computer, the first authentication process to perform from among the plurality of authentication processes;
generating and transmitting the first authentication indicator to the authentication computer, wherein the issuer computer authorizes the first transaction at least based on the first authentication indicator;
receiving, during a second transaction that uses a second account of a second user, a second personal identifier verification request message from the authentication computer, wherein the second personal identifier verification request message comprises a second personal identifier of the second user;
in response to receiving the second personal identifier verification request message, determining a second level of assurance required by at least one of the authentication computer or the server computer, the second level of assurance being higher than the first level of assurance;
based on the second level of assurance:
determining that the first authentication process is unsuitable,
selecting the second authentication process as satisfying a required authentication process, the second authentication process being slower than the first authentication process;
performing the second authentication process in response to determining, by the server computer, the second authentication process to perform from among the plurality of authentication processes;
receiving a transaction authorization request message for the second transaction; and
modifying the transaction authorization request message to insert an encrypted second personal identifier of the second user stored by the server computer, and transmitting the transaction authorization request message to the issuer computer, wherein a second issuer computer authorizes the second transaction based on information provided in the transaction authorization request message.

12. The server computer of claim 11, wherein the first personal identifier of the first user is encrypted and is an encrypted PIN.

13. The server computer of claim 11, wherein the server computer is configured to operate in a payment processing network.

14. The server computer of claim 11, wherein the method further comprises:
  receiving a first authorization response message from the issuer computer; and
  transmitting the first authorization response message to the service provider computer.

15. The server computer of claim 11, wherein determining, by the server computer, the first authentication process to perform comprises analyzing issuer data and payment network data associated with the first personal identifier verification request message.

16. The server computer of claim 11, wherein the first personal identifier verification request message is an ISO 8583 message including a PAN, transaction amount, and CVV.

17. The server computer of claim 11, further comprising, prior to receiving the second personal identifier verification request message:
  receiving, at the authentication computer, the second personal identifier of the second user from a consumer device, after the second user interacts with the service provider computer.

18. The server computer of claim 11, wherein the service provider computer is a merchant computer, and the server computer is in a payment processing network.

19. The server computer of claim 11, wherein the first personal identifier of the first user, and the second personal identifier of the second user is each a biometric identifier.

20. The server computer of claim 11, wherein the first personal identifier verification request message is an ISO 8583 message including a PAN, transaction amount, and CVV originating from a point of sale terminal and passes through an acquirer computer.

21. A method comprising:
  receiving, at a server computer and during a transaction that uses an account of a user, a personal identifier verification request message from an authentication computer, wherein the personal identifier verification request message comprises a personal identifier of the user;
  in response to receiving the personal identifier verification request message,
  determining, by the server computer, a level of assurance required by at least one of the authentication computer or the server computer,
  based on the level of assurance being a first level of assurance, selecting, by the server computer from among a plurality of authentication processes comprising a first authentication process and a second authentication process, the first authentication process;
  performing, by the server computer, the first authentication process in response to determining, by the server computer, the first authentication process to perform from among the plurality of authentication processes, wherein the first authentication process comprises verifying that the received personal identifier of the user matches a stored personal identifier of the user,
  generating a first authentication indicator when the received personal identifier of the user matches the stored personal identifier of the user, and transmitting the generated first authentication indicator to the authentication computer, wherein an issuer computer authorizes the transaction at least based on the first authentication indicator;
  based on the level of assurance being a second level of assurance, the second level of assurance being higher than the first level of assurance:
    determining, by the server computer, that the first authentication process is unsuitable;
    selecting, by the server computer, the second authentication process as satisfying a required authentication process, the second authentication process being slower than the first authentication process;
  performing, by the server computer, the second authentication process in response to determining, by the server computer, the second authentication process to perform from among the plurality of authentication processes, wherein the second authentication process comprises storing an encrypted personal identifier of the user in a database, generating a second authentication indicator without performing a matching of personal identifiers, forwarding the second authentication indicator to the authentication computer, which then transmits the second authentication indicator and a primary account identifier to a service provider computer;
  receiving, by the server computer, an authorization request message comprising the primary account identifier and the second authentication indicator from the service provider computer;
  modifying, by the server computer, the authorization request message to insert an encrypted second personal identifier of the user stored by the server computer; and
  transmitting, by the server computer, the authorization request message to the issuer computer, wherein the issuer computer authorizes the transaction based on information provided in the modified authorization request message.

* * * * *

UNITED STATES PATENT AND TRADEMARK OFFICE
CERTIFICATE OF CORRECTION

| | |
|---|---|
| PATENT NO. | : 11,928,678 B2 |
| APPLICATION NO. | : 16/435193 |
| DATED | : March 12, 2024 |
| INVENTOR(S) | : James Dene Dimmick |

It is certified that error appears in the above-identified patent and that said Letters Patent is hereby corrected as shown below:

In the Claims

Claim 1, Column 20, Line 27, delete the word "first".

Signed and Sealed this
Sixteenth Day of July, 2024

Katherine Kelly Vidal
*Director of the United States Patent and Trademark Office*